US011370406B2

United States Patent
Runde et al.

(10) Patent No.: US 11,370,406 B2
(45) Date of Patent: Jun. 28, 2022

(54) POWER CONTROL SYSTEM WITH CLUTCH BRAKING FUNCTION

(71) Applicant: Deere & Company, Moline, IL (US)

(72) Inventors: Jeffrey E. Runde, Cedar Falls, IA (US); William J. Vande Haar, Janesville, IA (US); Benjamin E. Shores, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 263 days.

(21) Appl. No.: 16/810,628

(22) Filed: Mar. 5, 2020

(65) Prior Publication Data

US 2021/0277994 A1 Sep. 9, 2021

(51) Int. Cl.
*B60W 10/11* (2012.01)
*B60W 10/198* (2012.01)
(Continued)

(52) U.S. Cl.
CPC ............ *B60W 10/11* (2013.01); *B60W 10/02* (2013.01); *B60W 10/182* (2013.01);
(Continued)

(58) Field of Classification Search
CPC .... B60W 10/11; B60W 10/02; B60W 10/182; B60W 10/198; B60W 30/18109; F16H 3/093; F16H 61/0059; F16H 2200/0078
See application file for complete search history.

(56) References Cited

U.S. PATENT DOCUMENTS

| | | |
|---|---|---|
| 3,651,904 A | 3/1972 | Snoy et al. |
| 4,090,414 A | 5/1978 | White |

(Continued)

FOREIGN PATENT DOCUMENTS

| | | |
|---|---|---|
| DE | 102015207555 A1 | 10/2015 |
| DE | 102015215461 A1 | 2/2016 |

(Continued)

OTHER PUBLICATIONS

Deere & Company, pending Utility U.S. Appl. No. 16/371,598, filed Apr. 1, 2019.

(Continued)

*Primary Examiner* — Richard W Ridley
*Assistant Examiner* — Aimee Tran Nguyen
(74) *Attorney, Agent, or Firm* — Klintworth & Rozenblat IP LLP (57) ABSTRACT

A control system for operating a work vehicle powertrain includes an engine configured to generate power for an output shaft. The control system includes a transmission positioned operatively between the engine and the output shaft and configured to selectively transfer the power along a power flow path between the engine and the output shaft. The transmission includes an input shaft; at least one intermediate shaft; at least one directional clutch; and intermediate clutches configured for selective engagement to transfer power between the at least one intermediate shaft and the output shaft. A controller is configured to receive a vehicle stop request to stop the work vehicle; implement, upon receiving the vehicle stop request, a clutch braking function; and generate, upon the implementation of the clutch braking function, clutch commands to engage at least two of the intermediate clutches selected such that the output shaft is slowed and stopped.

18 Claims, 7 Drawing Sheets

(51) Int. Cl.
  *F16H 61/00*   (2006.01)
  *F16H 3/093*   (2006.01)
  *B60W 10/18*   (2012.01)
  *B60W 30/18*   (2012.01)
  *B60W 10/02*   (2006.01)

(52) U.S. Cl.
  CPC .... *B60W 10/198* (2013.01); *B60W 30/18109* (2013.01); *F16H 3/093* (2013.01); *F16H 61/0059* (2013.01)

(56) References Cited

U.S. PATENT DOCUMENTS

| | | | |
|---|---|---|---|
| 4,989,470 | A | 2/1991 | Bulgrien |
| 5,353,662 | A | 10/1994 | Vaughters |
| 6,684,148 | B2 | 1/2004 | Chess |
| 8,544,964 | B2 | 10/2013 | Rekow et al. |
| 8,986,162 | B2 | 3/2015 | Dix et al. |
| 2004/0094381 | A1 | 5/2004 | Versteyhe |
| 2013/0054098 | A1* | 2/2013 | Lorentz ............... F16H 61/0059 701/53 |
| 2014/0315685 | A1 | 10/2014 | Hofler |
| 2015/0101431 | A1* | 4/2015 | Hou .................. F16H 59/20 74/336 R |
| 2018/0043764 | A1 | 2/2018 | McKinzie et al. |
| 2020/0309258 | A1 | 10/2020 | McKinzie et al. |
| 2021/0197772 | A1* | 7/2021 | Tsumano ................ B60T 1/062 |

FOREIGN PATENT DOCUMENTS

| | | |
|---|---|---|
| DE | 102016200174 A1 | 7/2017 |
| DE | 102018212712 A1 | 1/2019 |
| DE | 102020202651 A1 | 11/2020 |
| EP | 0708276 B1 | 4/1996 |
| EP | 2855226 A2 | 4/2015 |
| GB | 2576746 B | 10/2020 |

OTHER PUBLICATIONS

German Search Report issued in application No. DE102021201057.1, dated Jul. 28, 2021, 10 pages.

German Search Report issued in counterpart application No. 102020202651.3 dated Sep. 1, 2020 (8 pages).

USPTO non-final office action issued in Utility U.S. Appl. No. 16/371,598 dated Jul. 21, 2020.

German Search Report issued in application No. DE102021211456.3 dated Apr. 5, 2022. (12 pages).

* cited by examiner

POWER CONTROL SYSTEM WITH CLUTCH BRAKING FUNCTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system for a work vehicle, and more specifically to braking functions of a power control system for a transmission of the work vehicle.

BACKGROUND OF THE DISCLOSURE

Work vehicles perform various functions across a number of industries, including agricultural, forestry, construction, and the like. Typically, such work vehicles are large, and thus, require a great amount of energy to slow or stop. As a result, these work vehicles may include powertrains that implement one or more types of braking functions to facilitate stopping the work vehicle.

SUMMARY OF THE DISCLOSURE

The disclosure provides a power control system for a transmission of a work vehicle.

In one aspect, the disclosure provides a control system for operating a powertrain of a work vehicle having an engine configured to generate power for an output shaft. The control system includes a transmission positioned operatively between the engine and the output shaft and configured to selectively transfer the power along a power flow path between the engine and the output shaft. The transmission includes an input shaft configured to receive the power from the engine; at least one intermediate shaft arranged in the power flow path between the input shaft and the output shaft; at least one directional clutch configured for selective engagement to transfer power between the input shaft and the at least one intermediate shaft; and a plurality of intermediate clutches configured for selective engagement to transfer power between the at least one intermediate shaft and the output shaft. The control system further includes a controller, having a processor and memory architecture, configured to: receive a vehicle stop request to stop the work vehicle; implement, upon receiving the vehicle stop request, a clutch braking function; and generate, upon the implementation of the clutch braking function, clutch commands to engage at least two of the intermediate clutches selected such that the output shaft is slowed and stopped to stop the work vehicle.

In another aspect, a work vehicle is provided and includes an engine; an output shaft; and a transmission positioned operatively between the engine and the output shaft and configured to selectively transfer power along a power flow path between the engine and the output shaft. The transmission includes an input shaft configured to receive the power from the engine; at least one intermediate shaft arranged in the power flow path between the input shaft and the output shaft; at least one directional clutch configured for selective engagement to transfer between the input shaft and the at least one intermediate shaft; and a plurality of intermediate clutches configured for selective engagement between the at least one intermediate shaft and the output shaft. The work vehicle further includes a controller, having a processor and memory architecture, configured to: receive a vehicle stop request to stop the work vehicle with a clutch braking function; implement, upon receiving the vehicle stop request, the clutch braking function; and generate, upon the implementation of the clutch braking function, clutch commands to engage at least two of the intermediate clutches selected such that the output shaft is slowed and stopped to stop the work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed powertrain (or vehicle), as shown in the accompanying figures of the drawings described briefly above. Various modifications to the example embodiments may be contemplated by one of skill in the art.

A power control system is implemented on a work vehicle having a powertrain with an engine that provides power to drive the work vehicle and perform work functions. The power control system includes a transmission with a number of clutches, shafts, gears, and other power transfer elements to implement various speed ratios and directions. Generally, the clutches are selectively and fully engaged to transfer power to propel the work vehicle in different directions and at different speed ratios. Additionally, as described herein, the power control system may implement a clutch braking function in which two or more of the intermediate clutches are fully or partially engaged to stop the rotation of the output shaft, and thus, the work vehicle. The clutch braking function may be used in cooperation with an engine brake and/or a parking brake. By using the braking functions of the present disclosure, the power control system enables more consistent and effective stopping of the work vehicle.

Figure 1:
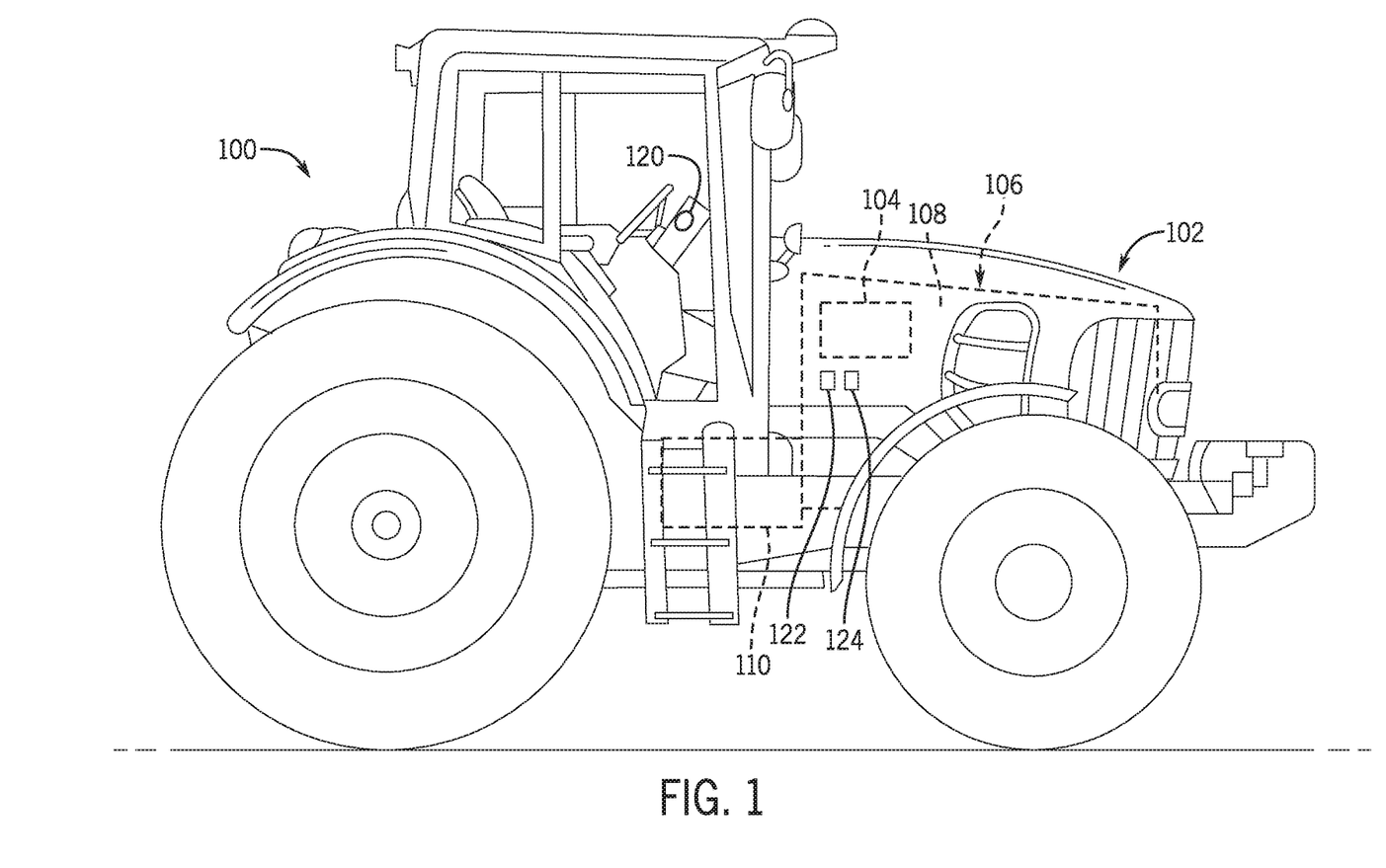
FIG. 1 is a side view of an example work vehicle that uses a power control system in accordance with an example embodiment of this disclosure.

As one example, FIG. 1 is a schematic side view of a work vehicle 100 to implement the clutch braking function. In FIG. 1, the work vehicle 100 is depicted as a tractor. It will be understood, however, that other configurations may be possible, including configurations with work vehicle 100 as a different kind of tractor, a harvester, a log skidder, a grader, or one of various other work vehicle types.

In one example, the work vehicle 100 includes a power control system 102 implemented with a controller 104 to control components of a powertrain 106 of the work vehicle 100. Generally, the powertrain 106 includes an engine 108 and a transmission 110 with power transfer elements to power the work vehicle 100 in forward and reverse directions, as well as to provide mechanical or electrical power to various additional systems of the work vehicle 100, including to power wheels for propulsion. Although not shown, the powertrain 106 may also include motors, batteries, and any suitable power sources or power transfer elements.

Generally, the controller 104 may generate commands for implementing various aspects of the power control system 102 based on various types of inputs to implement the desired operational function, e.g., to achieve the requested output torque for overall control of the work vehicle 100. This includes vehicle accelerations, stops, starts, shifting between gear ratios, shifting between directions, and the like. Additionally, the controller 104 of the power control system 102 selectively operates during aspects of these functions in situations to implement vehicle braking to facilitate stopping of the work vehicle 100. Additional details about the implementation of the braking functions of the power control system 102 are provided below.

In this example, the controller 104 may be configured as computing device with associated processor device and memory architecture. As such, the controller 104 may be configured to execute various computational and control functionality with respect to the work vehicle 100. The controller 104 may be in electronic, hydraulic, or other communication with various other systems or devices of the work vehicle 100, including via a CAN bus (not shown). For example, the controller 104 may be in communication with various actuators, sensors, and other devices within (or outside of) the work vehicle 100, some of which are discussed in greater detail below.

In some embodiments, the controller 104 may be configured to receive input commands and to interface with an operator via an operator interface device 120, including typical steering, acceleration, and velocity controls, as well as other suitable controls. Example devices include levers, pedals, buttons, knobs, interactive display elements, and the like in the vehicle cab and/or remote from the work vehicle 100. In one embodiment, such operator interface devices 120 may include a lever or other transmission selection device that facilitates operator interaction with the power transfer elements of the powertrain 106, particularly those that initiate transitions with respect to direction or speed. The operator interface devices 120 may also include wheel braking devices that actuate wheel or axles brakes (e.g., friction brakes) on the vehicle axles or at the wheels to slow or stop movement of the work vehicle 100. Further operator interface devices 120 may include a parking braking actuation device that functions to engage a parking brake. Other operator interface devices 120 may include devices that activate or enable an engine brake and/or the clutch braking function described in greater detail below.

As noted above, the work vehicle 100 may include one or more sensors 122, 124 in communication to provide various types of feedback and data to the controller 104 in order to implement the functions described herein, such as the transmission and/or the vehicle braking functions. Such sensors may include an output speed sensor 122 that collects information associated with the speed of the work vehicle 100, and one or more clutch sensors 124 that collect information associated with characteristics (pressures, positions, and the like) of one or more transmission clutch elements, as described below.

Figure 2:
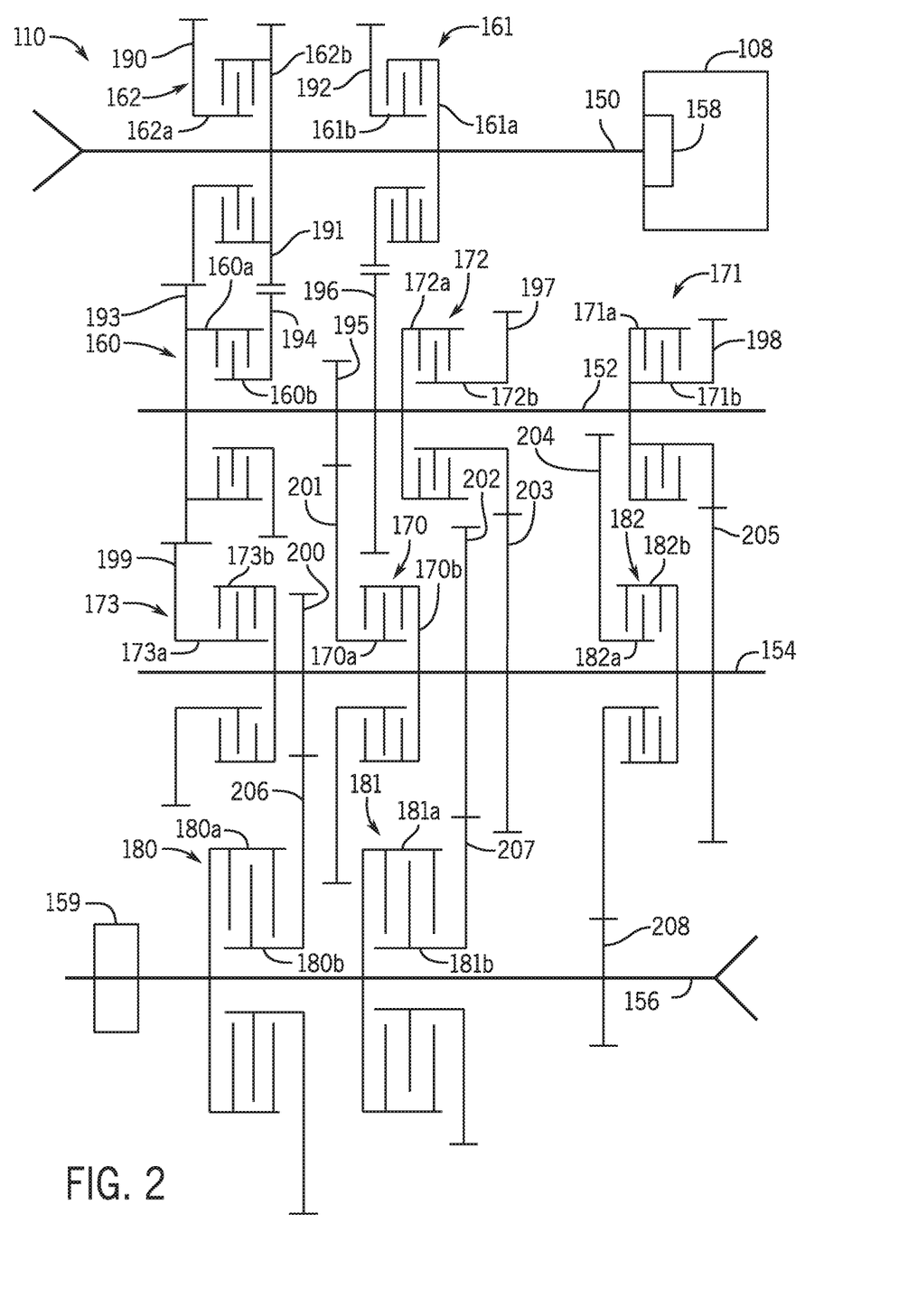
FIG. 2 is a powertrain for implementing braking functions within the power control system of the example work vehicle of FIG. 1 in accordance with an example embodiment.

Referring now to FIG. 2, an example powertrain 106 is depicted as implementing aspects of the power control system 102, particularly a vehicle braking function such as clutch braking. Generally, the power control system 102 may be considered to include the powertrain 106 and the controller 104 (FIG. 1), which is in communication with the various components of the powertrain 106 and additionally receives information from operator interface devices 120 and sensors 122, 124 (FIG. 1). As introduced above, the powertrain 106 may include the engine 108, which may be an internal combustion engine of various known configurations, and the transmission 110 that transfers power from the engine 108 to one or more output sinks (e.g., the wheels). The powertrain 106 may also include other power sources (not shown) such as continuously variable power sources (e.g., an electrical or hydraulic motor).

Generally, in one example, the transmission 110 of the powertrain 106 may be any suitable type of transmission arrangement. As described below, the transmission 110 includes a number of gearing, clutch, and control assemblies to suitably drive the output elements at different speeds in multiple directions. One example transmission 110 will be described prior to a more detailed description of the clutch braking function and overall vehicle braking operation.

In this example, the transmission 110 includes a number of shafts 150, 152, 154, to facilitate power transfer. In particular, the transmission 110 includes an input shaft 150 that is coupled to receive power from the engine 108, and an output shaft 156 that is coupled to transfer the power to the wheels. The engine 108 may provide rotational power via an engine output element, such as a flywheel, to the input shaft 150 according to commands from the controller 104 based on the desired operation. In this example, the engine 108 is coupled to the input shaft 150 and may include an engine brake 158, introduced above. The transmission 110 further includes first and second countershafts (or intermediate shafts) 152, 154 arranged in between the input and output shafts 150, 156 to condition the power through the transmission 110, including modifying the direction of power flow. As such, during propulsion, power from the engine 108 drives the input shaft 150, which in turn selectively drives the countershafts 152, 154 and/or the output shaft 156 to drive the wheels. Additionally, when in motion without engine power, inertia may operate such that the output shaft 156 and associated engaged elements of the powertrain 106 are driven by torque from the wheels; and in such conditions, the vehicle braking functions described below operate to slow down or stop the wheels, the output shaft 156, other portions of the transmission 110, and/or the engine 108 to slow down or stop the work vehicle 100.

The transmission 110 further includes a number of clutches 160-162, 170-173, 180-182 and gears 190-208 that implement and enable the power transfer through the transmission 110. Each clutch 160-162, 170-173, 180-182 includes first and second portions (designated with the respective reference number and "a" or "b") that are, based on commands from the controller 104, selectively engaged to transfer power through the respective clutch, disengaged to disconnect the potential power flow through the respective clutch, or partially engaged and/or "modulated" to transfer only a portion of the power through the respective clutch. In one example, the clutches 160-162, 170-173, 180-182 may be actuated with hydraulic valves, although other clutch types may be provided.

The clutches 160-162, 170-173, 180-182 include high and low range forward directional clutches 160, 161 and a reverse directional clutch 162. In this example, low range directional clutch 161 and reverse clutch 162 are mounted on the input shaft 150, and the high range directional clutch 160 is mounted on the first countershaft 152. As such, the directional clutches 160-162 operate to couple the engine power to the initial countershaft 152. The clutches 160-162, 170-173, 180-182 further include speed clutches 170-173 and range clutches 180-182 to modify the power flow through the transmission 110. In this example, the first speed clutch 170 and fourth speed clutch 173 are mounted on the second countershaft 154; the second speed clutch 171 and third speed clutch 172 are mounted on the first countershaft 152; the first range clutch 180 and second range clutch 181 are mounted on the output shaft 156; and the third range clutch 182 is mounted on the second countershaft 154. The speed and range clutches 170-173, 180-182 may be considered "intermediate" clutches in that these clutches are not considered directional clutches (e.g., not clutches that function in the manner of clutches 160-162). For example, the intermediate clutches 170-173, 180-182 function to transfer power between countershafts 152, 154 or between a countershaft 154 and the output shaft 156. The directional clutches 160-162 are considered "directional" because the engagements and disengagements of such clutches define the direction of the output shaft rotation relative to the input shaft rotation, whereas the other clutches 170-173, 180-182 define the speed (or range of speeds) of the output shaft rotation relative to the input shaft rotation. In this arrangement, the directional relationship between input shaft 150 and the first countershaft 152 (and the subsequent shafts 154, 156) is dictated by the directional clutches 160-162.

The various gears 190-208 are arranged to implement the transfer of power enabled by the selectively engaged clutches 160-162, 170-173, 180-182 into, out of, and through the transmission 110. Additionally, a parking brake 159 may be coupled to the output shaft 156 such that, when engaged, the parking brake 159 maintains a stationary position of the output shaft 156, and thus, the work vehicle 100.

Generally, the high or low range directional clutches 160, 161 are engaged when the work vehicle 100 is traveling in the forward direction, and the reverse clutch 162 is engaged when the work vehicle 100 is traveling in the reverse direction. Additionally, various combinations of speed and range clutches 170-173, 180-182 are engaged in the forward or reverse directions to condition the power from the input shaft 150, through one or both of the countershafts 152, 154, to the output shaft 156. In particular, based on the engagement of the clutches 160-162, 170-173, 180-182, the power flows through a number of gears 190-208, with varying numbers of teeth, to modify the speed of the power through the transmission 110, thereby providing the desired output at the output shaft 156, and thus, the wheels of the work vehicle 100. An example tooth count for the various gears 190-208 are listed in Table 1 below:

TABLE 1

| Gear | Teeth |
| --- | --- |
| First gear 190 | 46 |
| Second gear 191 | 49 |
| Third gear 192 | 43 |
| Fourth gear 193 | 48 |
| Fifth gear 194 | 53 |
| Sixth gear 195 | 25 |
| Seventh gear 196 | 54 |
| Eighth gear 197 | 36 |
| Ninth gear 198 | 31 |
| Tenth gear 199 | 51 |
| Eleventh gear 200 | 25 |
| Twelfth gear 201 | 64 |
| Thirteenth gear 202 | 48 |
| Fourteen gear 203 | 51 |
| Fifteenth gear 204 | 75 |
| Sixteenth gear 205 | 59 |
| Seventeenth gear 206 | 74 |
| Eighteenth gear 207 | 51 |
| Nineteenth gear 208 | 25 |

The shafts 150, 152, 154, 156, clutches 160-162, 170-173, 180-182, and gears 190-208 may have any suitable arrangement and command schedules to implement the variations in speed and direction for the work vehicle 100. Additional examples of transmissions and arrangements are provided below. As will now be described in greater detail below, the power control system 102 is configured to implement one or more braking functions to slow or stop the work vehicle 100 in one or more ways, including with clutch braking by one or more of the speed and range clutches 170-173, 180-182, engine braking with the engine brake 158, and output shaft or wheel braking by the parking brake 159.

Figure 3:
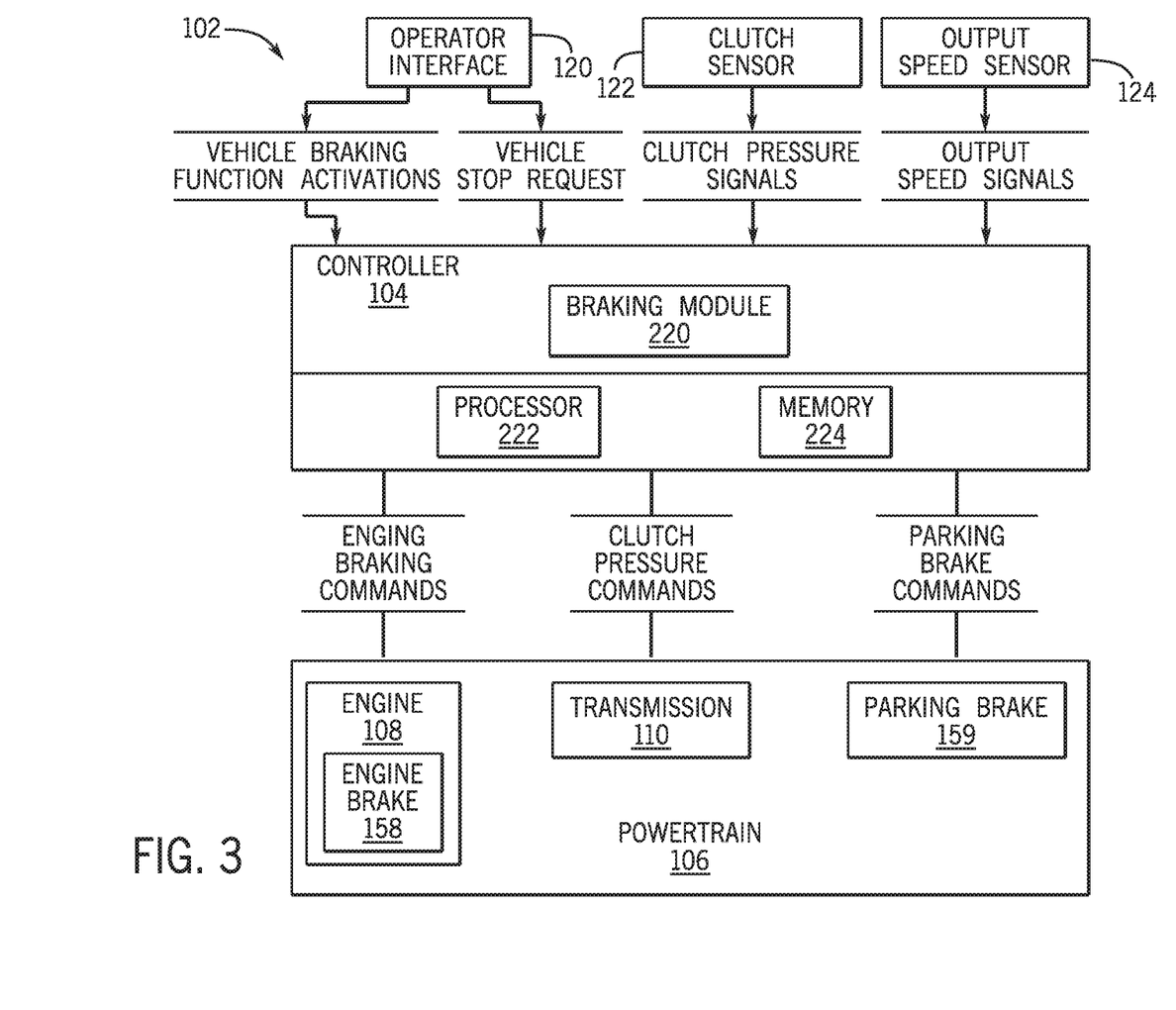
FIG. 3 is a dataflow diagram of a controller of the power control system in accordance with an example embodiment.

In addition to FIG. 2, reference is now made to FIG. 3, which is a dataflow diagram that illustrates an embodiment of the controller 104 implementing operation of the braking functions of the power control system 102. In this instance, the controller 104 may be considered a vehicle controller or a dedicated transmission controller. With respect to this aspect of the power control system 102 of FIG. 3, the controller 104 may be organized as one or more functional units or modules 220 (e.g., software, hardware, or combinations thereof), including a vehicle braking module 220. As an example, the module 220 and other aspects of the controller 104 may be implemented with processing architecture such as a processor 222 and memory 224, as well as suitable communication interfaces. For example, the controller 104 may implement the module 220 with the processor 222 based on programs or instructions stored in memory 224.

During operation, the controller 104, particularly the braking module 220, may receive an input signal representing a request by the operator via the operator interface device 120 to stop the work vehicle 100 in the form of a stop vehicle request. Additional input signals may include braking function activations that enable implementation or use of the engine brake 158 and/or the parking brake 159. In some embodiments, the braking module 220 may generate or receive a vehicle stop request and/or activations that are automatically generated, e.g., during autonomous vehicle operation.

In response and as discussed in greater detail below, the controller 104 shown in FIG. 3, particularly the braking module 220, may be configured to output one or more control signals in the form of engine brake commands to the engine brake 158, clutch pressure commands to one or more of the intermediate clutches 170-173, 180-182, and parking brake commands to the parking brake 159 (FIG. 2) of the transmission 110. Such commands may be generated from lookup tables, schedules, or algorithms according to various conditions and parameters according to the discussing herein. In additional to the module 220 and operation described below, the controller 104 may implement the typical functions of the transmission 110, e.g., shifting between speeds and transmission modes based on operating conditions and operator input, as well as the overall work vehicle 100.

In some examples, the consideration and implementation of the vehicle braking function, in particular the clutch braking function, by the controller 104 are continuous, e.g., constantly active. In other examples, the activation of the clutch braking function may be selective, e.g., enabled or disabled based on input from the operator or other considerations. In any event, the clutch braking function may be enabled and implemented as described below.

As shown, the braking module 220 may implement a number of braking functions in response to the vehicle stop request (and vehicle braking function activations), including a clutch braking function, a parking brake function, and an engine brake function. Typically, the braking module 220 may implement the clutch braking function with or without the engine brake function and the parking brake function, which are discussed in greater detail below. In one example, the clutch braking function operates by engaging one or more of the intermediate clutches 170-173, 180-182 and modulating and/or pressurizing one of more of the other intermediate clutches 170-173, 180-182. Since these partially or fully engaged intermediate clutches 170-173, 180-182 represent alternate power flow paths with different transmission ratios, the resulting interaction of the conflicting power flow paths functions to slow and ultimately stop rotation of the transmission 110, particularly the output shaft 156. During the clutch braking function, the torque from the transmission 110 through the output shaft 156 functions to counteract any torque on the output shaft 156 from the wheels to stop or slow the work vehicle 100. In other words, as the work vehicle 100 is traveling and desires to stop, the power from the wheels, through the output shaft 156 into the transmission 110, may be dissipated by the intermediate clutches 170-173, 180-182 implementing the clutch braking function. A more detailed example is listed below.

In some embodiments, the clutch braking function may be implemented in conjunction with the engine braking function in which the braking module 220 generates commands to engage the engine brake 158 in order to slow or stop power from the engine 108 transferred to the input shaft 150 and the other portions of the transmission 110. The engine brake 158 may be in the form of a compression release engine (or "Jake") brake that operates to open the exhaust valves in the engine cylinders to slow the output of the engine. In such embodiments, the braking module 220 also generates commands to maintain engagement of the appropriate directional clutches 160-162 to maintain the power flow path between the engine 108 and the transmission 110. In other embodiments, the clutch braking function may be implemented without the engine braking function in that the directional clutches may be disengaged to disconnect the power flow from the engine 108 through the transmission 110.

Additionally, the clutch braking function may be implemented in conjunction with the parking brake function. In particular, when the work vehicle 100 has slowed to a predetermined, relatively slow speed, or stopped, the braking module 220 may generate a parking brake command to engage the parking brake 159, which maintains the output shaft 156, and thus the work vehicle 100, in the stationary position. Upon engagement of the parking brake 159, the intermediate clutches 170-173, 180-182 engaged during the clutch braking function may be disengaged to terminate the clutch braking function. In other embodiments, the intermediate clutches 170-173, 180-182 engaged during the clutch braking function may be maintained, regardless of the state of the parking brake 159, to facilitate the maintenance the stationary position of the output shaft 156 and the work vehicle 100.

One particular example of the clutch braking function will be described within the context of the example transmission 110 of FIG. 2. Initially, upon request to stop the work vehicle 100, the braking module 220 may disconnect the power flow from the engine 108 into the transmission 110 by generating clutch commands that disengage the directional Clutches 160-162, thereby preventing any torque from being transferred from the input shaft 150 to the first countershaft 152. In one example, braking module 220 may additionally generate clutch commands to disconnect the power flow from the first countershaft 152 to the second countershaft 154 by disengaging each of the speed clutches 170-173. The braking module 220 then generates clutch commands to engage two or more of the range clutches 180-182 between the second countershaft 154 and the output shaft 156 such that the interaction of the two transmission ratios enabled by the partial or full engagements of the range clutches 180-182 functions to dissipate the energy of the output shaft 156 driven by the wheels of the work vehicle 100. Generally, any two or more range clutches 180-182 in between the second countershaft 154 and the output shaft 156 may be selected to implement the clutch braking function. In this example, the second range clutch 181 is fully engaged, and the first range clutch 180 may be modulated or at least partially engaged to implement the clutch braking function. During the clutch braking function, the output speed sensor 124 may collect information associated with the speed of the output shaft 156 or the speed of the associated wheels; and the clutch sensors 122 (e.g., particularly the sensor associated with the first range clutch 180) may collect information associated with the pressure or amount of engagement with the relevant clutch or clutches (e.g., the first range clutch 180). In response, the braking module 220 may increase or decrease the pressure to the modulated range clutch (e.g., first range clutch 180). In particular, if the reduction in speed is not sufficiently occurring or not occurring at an acceptable pace, the braking module 220 may increase the pressure to the modulated range clutch (e.g., the first range clutch 180). In one example, the braking module 220 may increase the pressure to the modulated range clutch (e.g., the first range clutch 180) until the work vehicle 100 is completely stopped. The partially or fully engaged modulated clutch (e.g., the first range clutch 180) may be maintained with the fully engaged clutch (e.g., the second range clutch 181) for a predetermined amount of time or until the parking brake 159 is engaged.

In one example, the braking module 220 may select the two range clutches 180-182 with the greatest difference in transmission ratios or relative torque advantage. In such an example, the first and third range clutches 180, 182 may be selected to implement the clutch braking function to stop the vehicle 100.

In some embodiments, the braking module 220 may command the speed clutches 170-173 to implement the clutch braking function instead of, or in combination with, the range clutches 180-182. For example, the input shaft 150 may be rotationally disconnected from the first countershaft 152 by disengaging the directional clutches 160-162; the output shaft 156 may be rotationally coupled to the second countershaft 154 by engaging one of the range clutches 180-182; and subsequently, one of the speed clutches 170-173 may be locked while another one of the speed clutches 170-173 may be modulated to implement the clutch braking function in between the first and second countershafts 152, 154. As e above, the braking module 220 may command the speed clutches 170-173 with the greatest differences in transmission ratios or relative torque advantages in order to provide the most effective clutch braking function. Similarly, the braking module 220 may select the range clutch 180-182 (e.g., first range clutch 180 in this example) that provides the highest transmission ratio or relative torque advantages for the output shaft 156 driving the second countershaft 154 relative to the other range clutches 180-182 (e.g., second or third range clutches 181, 182 in this example) in order to provide the most effective clutch braking function.

Figure 4:
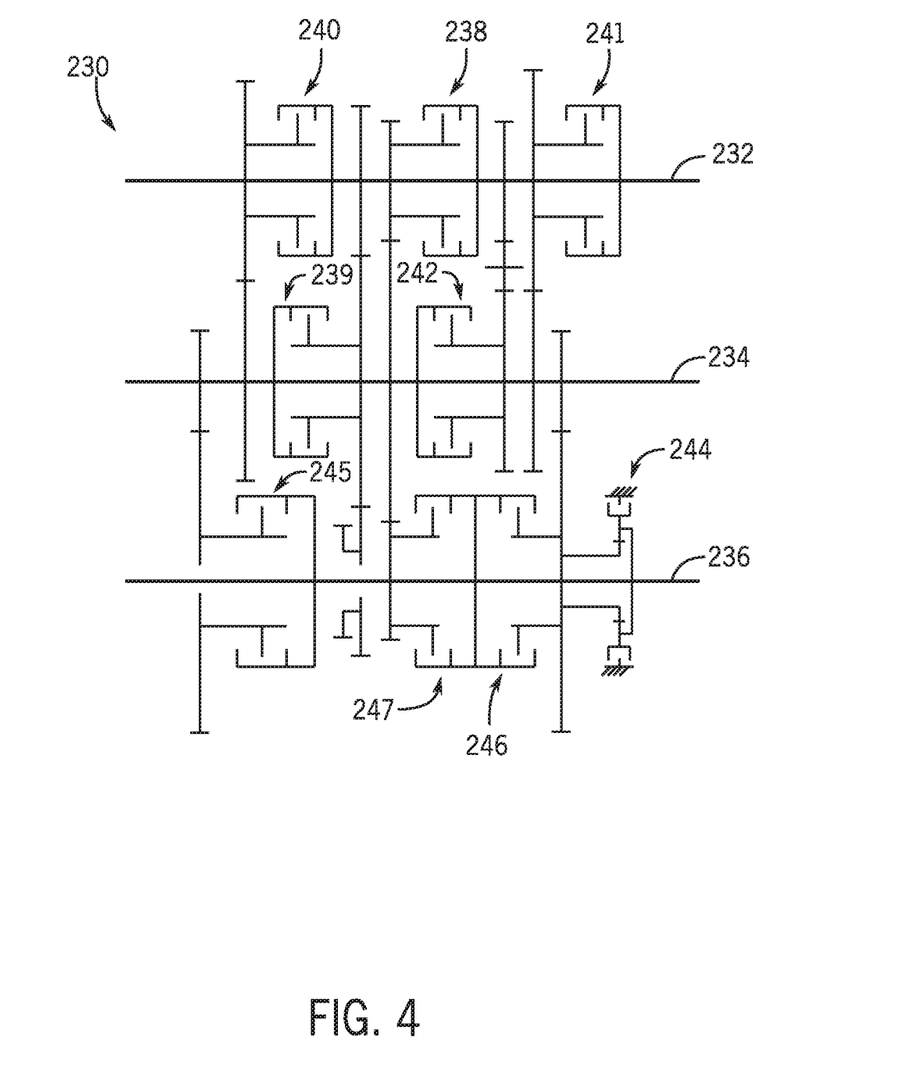
FIG. 4 is a transmission for implementing a clutch braking function in accordance with another example embodiment.

The clutch braking function may be implemented with various types of transmission arrangements. A further example of a transmission 230 is schematically depicted in FIG. 4. The transmission 230 includes an input shaft 232 attached to an engine (not shown), a countershaft 234, and an output shaft 236. A number of clutches 238-242, 244-247 and gear elements (unlabeled) operate to transfer torque in between the input shaft 232, the countershaft 234, and the output shaft 236. In the depicted transmission 230, directional clutches 238-242 selectively couple the input shaft 232 and the countershaft 234, and the range clutches 244-247 selectively couple the countershaft 234 to the output shaft 236. In this embodiment, the clutch braking function is implemented by locking or fully engaging one of the range clutches 244-247 and modulating another one of the range clutches 244-247 such that the output shaft 236 is slowed. As above, the clutch braking function may be implemented with or supplemented with an engine brake (not shown) or a parking brake (not shown).

As additionally noted above, the transmission ratios of selected clutch combinations also impact the effectiveness of the clutch braking function. This factor or parameter is described in greater detail below with reference to the relatively simple schematic, partial transmission arrangement 250 show in FIG. 5. The partial transmission arrangement 250 of FIG. 5 includes a countershaft 252 supporting a first range countershaft gear 254, and a second range countershaft gear 256 and an output shaft 258 supporting a first range output shaft clutch 260 and a second range output shaft gear 262. The input shaft or assembly is not shown. The first range output shaft clutch 260 is engaged with the first range countershaft gear 254, and the second range output shaft gear 262 is engaged with the second range countershaft gear 256. In this example, the first range output shaft clutch 260 has a first range output shaft clutch drum 260a mounted on the output shaft 258 and a first range output shaft clutch hub 260b enmeshed with the first range countershaft gear 254

Figure 5:
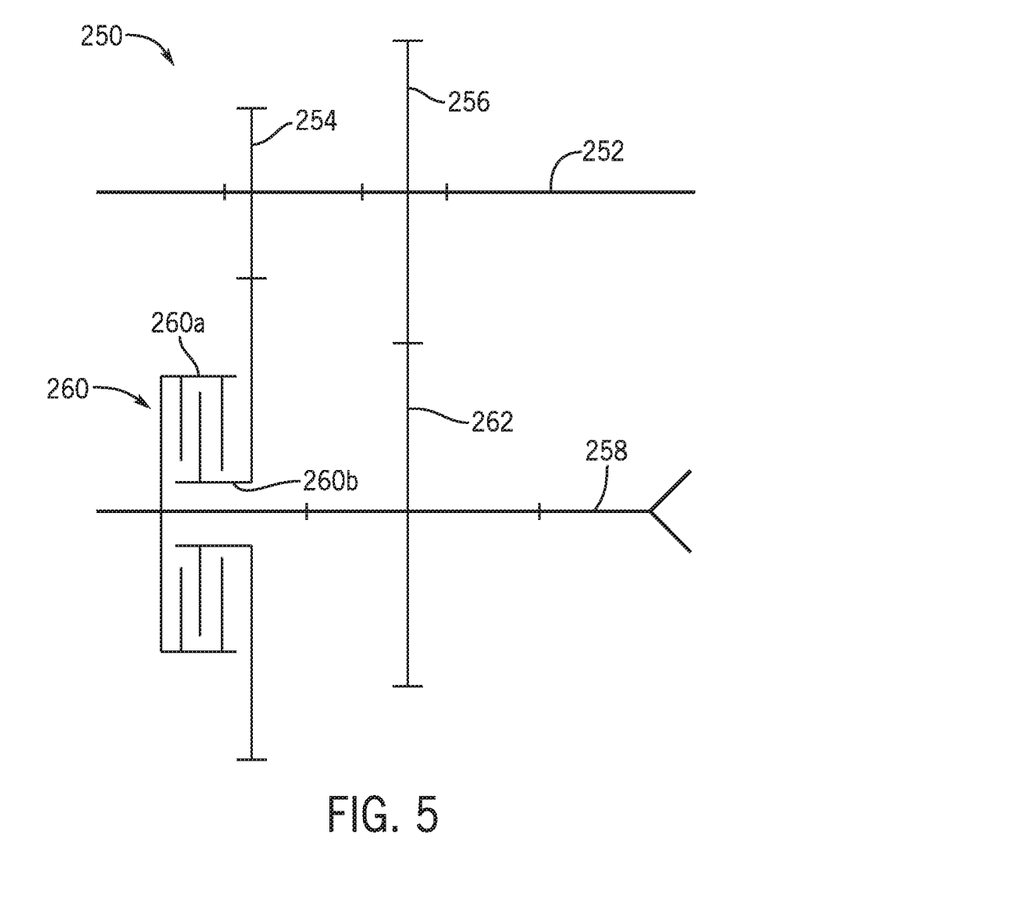
FIG. 5 a partial transmission arrangement for describing the clutch braking function in accordance with an example embodiment.

As such, the transmission arrangement 250 of FIG. 5 has two range gear sets, one with a clutch and one without. In this example description, the output shaft power may be considered negative when implementing clutch braking function on a set of wheels (not shown) coupled to the output shaft 258. Quantitatively, the effectiveness of clutch braking function in this example may be represented by the relative amounts of torque in the first range output shaft clutch 260 as a function of the transmission ratios, discussed below.

As a general example, the speed of the countershaft 252 is a function of the tooth counts on the second range output shaft gear 262 and second range countershaft gear and the speed of the output shaft 258, as represented by Equation (1):

$$\omega_{CS} = -(N_{R2OUT}/N_{RCS})\omega_{OUT} \qquad \text{Eq. (1)}$$

in which, $W_{CS}$ is the speed of the countershaft 252;

$N_{R2OUT}$ is the tooth count of the second range output shaft gear 262;

$N_{R2CS}$ is the tooth count of the second range countershaft gear 256; and $\omega_{OUT}$ is the speed of the output shaft 258.

The speed of the first range output shaft clutch hub 260b is a function of the first range tooth counts and the counter shaft speed, as reflected by Equation (2):

$$\omega_{R1HUB} = -(N_{R1CS}/N_{R1OUT})\omega_{CS} \qquad \text{Eq. (2)}$$

in which, $W_{R1HUB}$ is the speed of the first range output shaft clutch hub 260b;

$N_{R1CS}$ is the tooth count of the first range countershaft gear 254;

$N_{R1OUT}$ is the tooth count of the first range output shaft clutch hub 260b; and $\omega_{CS}$ is the speed of the countershaft 252.

If Equation 1 is combined with Equation 2, the result is that speed of the first range output shaft clutch hub 260b is a function of the tooth counts of the first range countershaft gear 254, the first range output shaft clutch hub 260b, the second range output shaft gear 262, and the second range countershaft gear 256, as well as the speed of the output shaft 258, as reflected by Equation (3):

$$\omega_{R1HUB} = (N_{R1CS}/N_{R1OUT})(N_{R2OUT}/N_{R2CS})\omega_{OUT} \qquad \text{Eq. (3)}$$

in which, $\omega_{R1HUB}$ is the speed of the first range output shaft Clutch hub 260b;

$N_{R1CS}$ is the tooth count of the first range countershaft gear 254;

$N_{R1OUT}$ is the tooth count of the first range output shaft clutch hub 260b;

$N_{R2OUT}$ is the tooth count of the second range output shaft gear 262;

$N_{R2CS}$ is the tooth count of the second range countershaft gear 256; and $\omega_{OUT}$ is the speed of the output shaft 258.

Equation (3) enables the calculation of slip speed of the first range output shaft clutch 260, as reflected by Equation (4):

$$\omega_{R1SLIP} = \omega_{R1HUB} - \omega_{R1DRUM} \qquad \text{Eq. (4)}$$

in which, $\omega_{R1SLIP}$ is the slip speed of the first range output shaft clutch 260;

$\omega_{R1HUB}$ is the speed of the first range output shaft clutch hub 260b; and $\omega_{R1DRUM}$ is the speed of the first range output shaft clutch drum 260a (in this example, is equal to speed of the output shaft 258).

Equations (1), (2), and (3) may be solved for the clutch torque, as reflected in Equation (5):

$$T_{R1CLUTCH}/T_{OUT} = -1/((N_{R1CS}/N_{R1OUT})(N_{R2OUT}/N_{R2CS})-1) \quad \text{Eq. (5)}$$

in which, $T_{R1CLUTCH}$ is the torque on the first range output shaft Clutch 260;

$T_{OUT}$ is the torque from the output shaft 258;

$N_{R1CS}$ is the tooth count of the first range countershaft gear 254;

$N_{R1OUT}$ is the tooth count of the first range output shaft Clutch hub 260b;

$N_{R2OUT}$ is the tooth count of the second range output shaft gear 262; and $N_{R2CS}$ is the tooth count of the second range countershaft gear 256.

From Equation (5), it is evident that, as the transmission ratios between the first and second ranges become closer to the same value, the magnitude of the clutch torque for the first range output shaft clutch 260 required to provide a braking torque to the output shaft 258 becomes greater; and as the transmission ranges have larger differences, the clutch braking becomes more effective. As a numerical example, Table (2) below provides the clutch torque for various ratios in order to satisfy a clutch braking demand of −3000 Nm needed at the output shaft 258 when the output shaft speed is 100 rad/sec.

Figure 6:
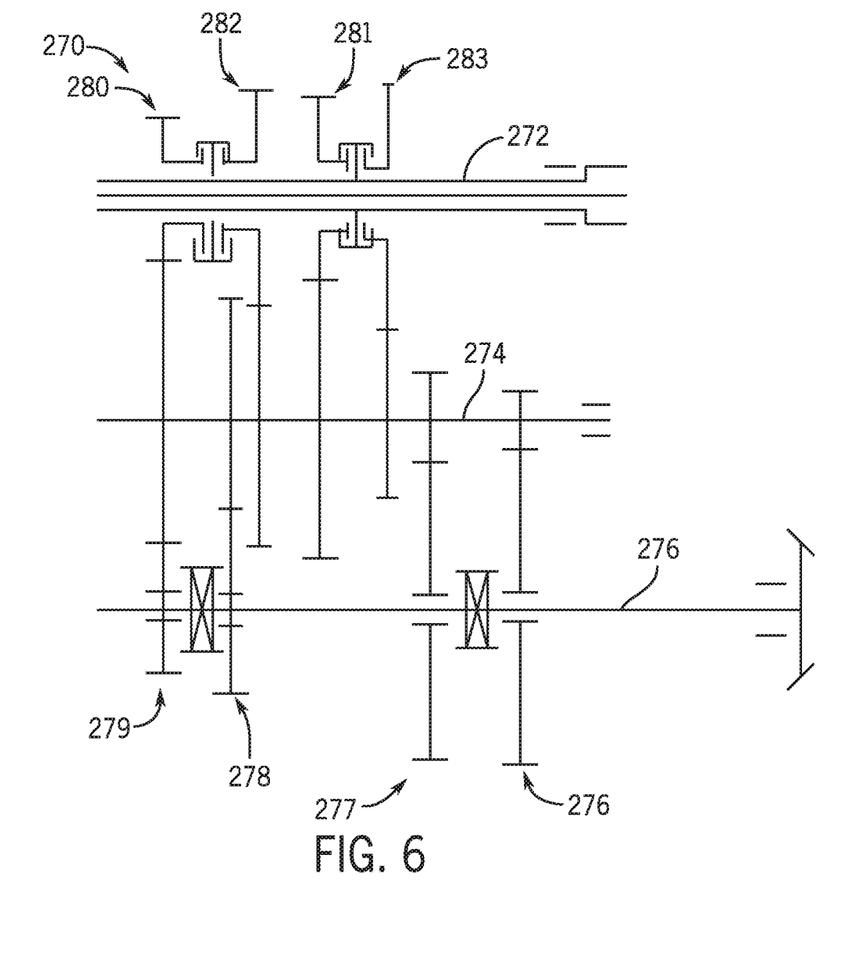
FIG. 6 a partial transmission arrangement for describing the clutch braking function according to a further example embodiment.

280-283 in the transmission arrangement 250 connecting the intermediate shafts 272, 274, the effectiveness is influenced by the range clutch 280-283 that is selected and engaged. Consistent with the fundamentals of Equations (1)-(5), discussed above, the following Equation (6) may be derived to represent the torque on the first speed clutch 280 as a function of the torque into the first speed clutch 280 and the tooth counts of the potential power flow paths.

$$T_{S1CLUTCH} = (N_{S1CS\_A}/N_{S1CS\_B})/((N_{S1CS\_A}/N_{S1CS\_B})(N_{S4CS\_B}/N_{S4CS\_A})-1)(T_{CS\_B}) \quad \text{Eq (6)}$$

in which, $T_{S1CLUTCH}$ is the torque at the first speed clutch 280;

$N_{S1CS\_A}$ is a tooth count for the first speed clutch 280 on the first countershaft 272;

$N_{S1CS\_B}$ is a tooth count for the gear on the second countershaft 274 meshing with the first speed clutch 280;

$N_{S4CS\_B}$ is the tooth count for the gear on the second countershaft 274 meshing with the fourth speed clutch 283;

$N_{S4CS\_A}$ is the tooth count for the fourth speed clutch 283 on the first countershaft 272; and $T_{CS\_B}$ is the torque from the second countershaft 274 into the first speed clutch 280.

In Table (3) below, clutch torques on the first speed clutch 280 for various example range gear combinations are pro-

TABLE 2

| Output Shaft Speed (rad/sec) | Output Shaft Torque (Nm) | Output Shaft Power (kW) | $N_{R1CS}$ + $N_{R1OUT}$ | $N_{R2CS}$ + $N_{R2OUT}$ | $\omega_{R1HUB}$ | $\omega_{R1SLIP}$ | $T_{R1CLUTCH}$ | Clutch Power (kW) |
|---|---|---|---|---|---|---|---|---|
| 100 | −3000 | −300 | 0.2500 | 4.0000 | 6.3 | −93.8 | −3200 | 300 |
| 100 | −3000 | −300 | 0.3333 | 3.0000 | 11.1 | −88.9 | −3375 | 300 |
| 100 | −3000 | −300 | 0.5000 | 2.0000 | 25.0 | −75.0 | −4000 | 300 |
| 100 | −3000 | −300 | 0.7500 | 1.3333 | 56.3 | −43.8 | −6857 | 300 |
| 100 | −3000 | −300 | 0.9000 | 1.1111 | 81.0 | −19.0 | −15789 | 300 |
| 100 | −3000 | −300 | 1.1111 | 0.9000 | 123.5 | 23.5 | 12789 | 300 |
| 100 | −3000 | −300 | 1.3333 | 0.7500 | 177.8 | 77.8 | 3857 | 300 |
| 100 | −3000 | −300 | 2.0000 | 0.5000 | 400.0 | 300.0 | 1000 | 300 |
| 100 | −3000 | −300 | 3.0000 | 0.3333 | 900.0 | 800.0 | 375 | 300 |
| 100 | −3000 | −300 | 4.0000 | 0.2500 | 1600.0 | 1500.0 | 200 | 300 |

As a further example, FIG. 6 depicts a partial transmission arrangement 270 with a first countershaft 272 selectively coupled to a four speed clutches 280, 281, 282, 283; a second countershaft 274 coupled to the four speed clutches 280-283; and an output shaft selectively coupled to the second countershaft 274 with four range gears 286, 287, 288, 289. The input shaft or assembly is not shown. In this example, the output shaft 276 is coupled to the second countershaft 274 with synchronizers such that the range clutches 286-289 are not appropriate for the clutch braking function. Instead, the speed clutches 280-283 may be used to implement the clutch braking function. As noted above, the speed clutches 280-283 with the greatest differences in transmission ratios provide the most effective clutch braking. In this example, assuming that the first and fourth speed clutches 280, 283 have the greatest difference in transmission ratios, the fourth speed clutch 283 may be locked and the first speed clutch 280 may be modulated to implement the speed function via the second countershaft 274, the output shaft 276, and the associated torque transfer elements, including one of the range clutches 286-289.

As shown below, while it is possible to use the clutch braking function with any combination of speed clutches vided in view of example parameter values of Equation (6) to achieve a braking torque of 2000 Nm at the output shaft 276.

TABLE (3)

|  | First Range | Second Range | Third Range | Fourth Range |
|---|---|---|---|---|
| Output Shaft Torque (Nm) | −2000 | −2000 | −2000 | −2000 |
| Range Gear Teeth on Second CS | 17 | 31 | 45 | 62 |
| Range Gear Teeth on Output Shaft | 66 | 52 | 39 | 24 |
| Torque on Second CS (Nm) | 515 | 1192 | 2308 | 5167 |
| Teeth on S4 on First CS | 37 | 37 | 37 | 37 |
| Teeth on S4 on Second CS | 47 | 47 | 47 | 47 |
| Teeth on S1 on First CS | 26 | 26 | 26 | 26 |
| Teeth on S1 on Second CS | 62 | 62 | 62 | 62 |

TABLE (3)-continued

|  | First Range | Second Range | Third Range | Fourth Range |
|---|---|---|---|---|
| Torque Ratio of S1 and Second CS | −0.8974 | −0.8974 | −0.8974 | −0.8974 |
| S1 clutch torque (Nm) | −462 | −1070 | −2071 | −4637 |

As reflected by Table (3), the first range transmission ratio provides the most effective clutch braking function.

Figure 7:
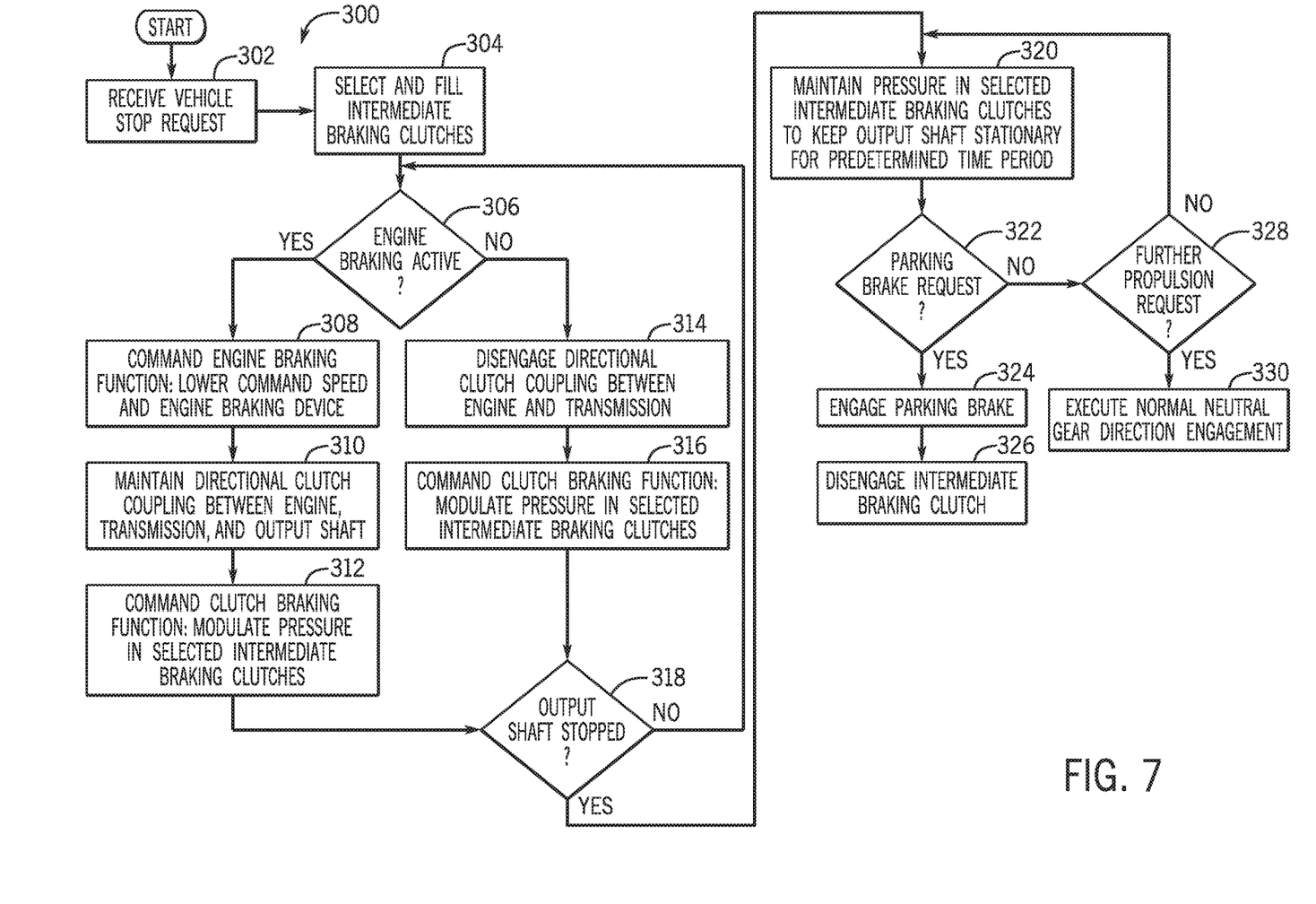
FIG. 7 is a flowchart depicting a method for implementing braking functions in a power control system in accordance with an example embodiment.

The embodiments discussed above may additionally be expressed as a method 300, such as reflected in the flow chart depicted in FIG. 7. In one example, the method 300 may be implemented by the power control system 102 described above, while in further examples, other mechanisms may be used, including other types of vehicles, transmissions, and clutch arrangements.

In a first step 302 of method 300, a controller receives a vehicle stop request. The vehicle stop request may be generated from the operator input interface or generated automatically during an autonomous generation (e.g., when conditions indicate that the work vehicle should be stopped, including a predetermined position, a barrier, an excess speed, an obstacle, and/or a completion of a work task). In a step 304, the controller selects the appropriate intermediate clutches to implement a clutch braking function and prepares for implementation by filling the actuators of the selected intermediate clutches with fluid. Upon implementing step 304, the method 300 proceeds to step 306. In some embodiments, as reflected by conditional step 306, an engine braking function may be selectively implemented or activated. If the engine braking function is active, the method 300 proceeds to step 308; and if the engine braking function is inactive or unavailable, the method 300 proceeds to step 314.

In step 308, the controller generates commands for the engine braking function, including a lower speed command and activating an engine brake. Upon implementing step 308, the method 300 proceeds to step 310. In step 310, the controller maintains the appropriate coupling or engagement by the directional clutch or clutches between the engine, transmission, and output shaft. Upon implementing step 310, the method 300 proceeds to step 312. In step 312, the controller generates clutch commands to implement the clutch braking function with the selected intermediate clutches, including fully engaging a first selected intermediate clutch and modulating a second selected intermediate clutch. Upon implementing step 312, the method 300 proceeds to step 318, discussed below.

In step 314, upon determining that the engine braking is inactive or unavailable, the controller generates clutch commands to disengage any coupling of the directional clutches between the engine and the transmission. Upon implementing step 314, the method 300 proceeds to step 316. In step 316, the controller generates clutch commands to implement the clutch braking function with the selected intermediate clutches, including fully engaging a first selected intermediate clutch and modulating a second selected intermediate clutch. Upon implementing step 316, the method 300 proceeds to step 318.

In step 318, the controller considers the output shaft speed to determine if the work vehicle has stopped. If the work vehicle is still moving in step 318, the method 300 proceeds back to step 306 to continue one or more of the braking functions. If the work vehicle has stopped in step 318, the method 300 proceeds to step 320.

In step 320, the controller generates clutch commands to maintain the pressure in the selected intermediate braking clutches to at least temporarily maintain the stationary position of the output shaft. Upon implementing step 320, the method 300 proceeds to step 322. In step 322, the controller determines if a parking brake function has been requested, e.g., based on operator input via an operator interface device or generated automatically. In step 322, if the parking brake request has been received, the method 300 proceeds to step 324; and if the parking brake request has not been received, the method 300 proceeds to step 328. In step 324, the controller generates commands to engage a parking brake to maintain the stationary position of the work vehicle; and in a subsequent step 326, the controller generates commands to disengage the selected intermediate braking clutches.

In step 328, the controller considers if a further propulsion request has been received, e.g., a request generated by an operator via an operator interface or generated automatically to propel the work vehicle in a forward or reverse direction. In step 328, if a e further propulsion request has not been received, the method 300 returns to step 320 in which the stationary position of the work vehicle is maintained by continuing the pressure on the selected intermediate braking clutches. In step 328, if a further propulsion request has been received, the method 300 proceeds to step 330 in which the propulsion request is implemented to continue operation of the work vehicle.

Accordingly, the present power control system provides a powertrain and transmission with a number of braking functions, including a clutch braking function in which two or more intermediate clutches may be used to slow the work vehicle. In some instances, engine braking may compliment the Clutch braking function, as may operation of the parking brake. As such, a more consistent and effective braking of the work vehicle may be provided.

Also, the following examples are provided, which are numbered for easier reference.

1. A control system for operating a powertrain of a work vehicle having an engine configured to generate power for an output shaft, the control system comprising: a transmission positioned operatively between the engine and the output shaft and configured to selectively transfer the power along a power flow path between the engine and the output shaft, the transmission including: an input shaft configured to receive the power from the engine; at least one intermediate shaft arranged in the power flow path between the input shaft and the output shaft; at least one directional clutch configured for selective engagement to transfer power between the input shaft and the at least one intermediate shaft; a plurality of intermediate clutches configured for selective engagement to transfer power between the at least one intermediate shaft and the output shaft; and a controller, having a processor and memory architecture, configured to: receive a vehicle stop request to stop the work vehicle; implement, upon receiving the vehicle stop request, a clutch braking function; and generate, upon the implementation of the clutch braking function, clutch commands to engage at least two of the intermediate clutches selected such that the output shaft is slowed and stopped to stop the work vehicle.

2. The control system of example 1, wherein the controller is further configured to disengage, upon the implementation of the clutch braking function and prior to engagement of the at least two of the intermediate clutches, the at least one directional clutch to disconnect the power flow path between the input shaft and the at least one intermediate shaft.

3. The control system of example 1, wherein the controller is further configured to: determine, upon engagement of the at least two of the intermediate clutches during the clutch braking function, when the output shaft is stopped; and engaging, upon determining that the output shaft is stopped during the clutch braking function, a vehicle parking brake to maintain a stationary position of the work vehicle.

4. The control system of example 3, wherein the controller is further configured to disengage, upon engaging the vehicle parking brake, the engagement of the at least two of the intermediate clutches to terminate the clutch braking function.

5. The control system of example 1, wherein the controller is configured to maintain the engagement of the at least two of the intermediate clutches such that the work vehicle is at least temporarily maintained in a stationary position.

6. The control system of example 1, wherein the controller is configured to receive the vehicle stop command that is generated automatically based on a set of conditions.

7. The control system of example 1, wherein the controller is configured to receive the vehicle stop command that is generated based on an input at an operator interface device.

8. The control system of example 1, wherein the at least one intermediate shaft includes a first intermediate shaft and a second intermediate shaft arranged such that the power flow path is selectively transferred between the input shaft, the first intermediate shaft, the second intermediate shaft, and the output shaft; and wherein the at least two of the intermediate clutches are arranged such that, upon the engagement of the at least two of the intermediate clutches during the clutch braking function, the output shaft is stopped relative to the second intermediate shaft.

9. The control system of example 1, wherein the at least one intermediate shaft includes a first intermediate shaft and a second intermediate shaft arranged such that the power flow path is selectively transferred between the input shaft, the first intermediate shaft, the second intermediate shaft, and the output shaft; and wherein the at least two of the intermediate clutches are arranged such that, upon the engagement of the at least two of the intermediate clutches during the clutch braking function, the second intermediate shaft and the output shaft are stopped relative to the first intermediate shaft.

10. The control system of example 1, wherein the at least two of the intermediate clutches include at least three intermediate clutches, each with a respective transmission ratio, and wherein the controller is configured to, prior to the engagement of the at least two of the intermediate clutches during the clutch braking function, select a first intermediate clutch and a second intermediate clutch of the at least three intermediate clutches for the engagement based on the transmission ratios.

11. The control system of example 10, wherein the controller is configured to select two of the at least one intermediate clutch for engagement that have a greatest difference e in the transmission ratios.

12. The control system of example 1, wherein the controller is configured to generate, upon implementation of the clutch braking function, clutch commands to disengage the at least one directional clutch to disconnect the power flow path between the input shaft and the at least one intermediate shaft.

13. The control system of example 1, wherein the controller is configured to: generate, upon receipt of the vehicle stop request, an engine brake command to engage an engine brake; and generate, upon generation of the engine brake command, the clutch commands to maintain an engagement of the at least one directional clutch.

14. The control system of example 1, wherein the plurality of intermediate clutches include a plurality of range clutches and a plurality of speed clutches, and wherein the controller is configured to generate, upon the implementation of the clutch braking function, clutch commands to engage at least two of the range clutches as the at least two of the intermediate clutches selected such that the output shaft is slowed and stopped to stop the work vehicle.

15. The control system of example 1, wherein the plurality of intermediate clutches include a plurality of range clutches and a plurality of speed clutches, and wherein the controller is configured to generate, upon the implementation of the clutch braking function, clutch commands to engage at least two of the speed clutches as the at least two of the intermediate clutches selected such that the output shaft is slowed and stopped to stop the work vehicle.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the discussion above, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on. Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for operating a powertrain of a work vehicle having an engine configured to generate power for an output shaft, the control system comprising:

a transmission positioned operatively between the engine and the output shaft and configured to selectively transfer the power along a power flow path between the engine and the output shaft, the transmission including:
an input shaft configured to receive the power from the engine;
at least one intermediate shaft arranged in the power flow path between the input shaft and the output shaft;
at least one directional clutch configured for selective engagement to transfer power between the input shaft and the at least one intermediate shaft; and
a plurality of intermediate clutches configured for selective engagement to transfer power between the at least one intermediate shaft and the output shaft; and
a controller, having a processor and memory architecture, configured to:
receive a vehicle stop request to stop the work vehicle;
implement, upon receiving the vehicle stop request, a clutch braking function;
generate, upon the implementation of the clutch braking function, clutch commands to engage at least two of the intermediate clutches selected such that the output shaft is slowed and stopped to stop the work vehicle; and
generate, upon implementation of the clutch braking function, the clutch commands to disengage the at least one directional clutch to disconnect the power flow path between the input shaft and the at least one intermediate shaft.

2. The control system of claim 1, wherein the controller is further configured to disengage the at least one directional clutch prior to engagement of the at least two of the intermediate clutches.

3. The control system of claim 1, wherein the controller is configured to maintain the engagement of the at least two of the intermediate clutches such that the work vehicle is at least temporarily maintained in a stationary position.

4. The control system of claim 1, wherein the controller is configured to receive the vehicle stop request that is generated automatically based on a set of conditions.

5. The control system of claim 1, wherein the controller is configured to receive the vehicle stop request that is generated based on an input at an operator interface device.

6. The control system of claim 1,
wherein the at least one intermediate shaft includes a first intermediate shaft and a second intermediate shaft arranged such that the power flow path is selectively transferred between the input shaft, the first intermediate shaft, the second intermediate shaft, and the output shaft; and
wherein the at least two of the intermediate clutches are arranged such that, upon the engagement of the at least two of the intermediate clutches during the clutch braking function, the output shaft is stopped relative to the second intermediate shaft.

7. The control system of claim 1,
wherein the at least one intermediate shaft includes a first intermediate shaft and a second intermediate shaft arranged such that the power flow path is selectively transferred between the input shaft, the first intermediate shaft, the second intermediate shaft, and the output shaft; and
wherein the at least two of the intermediate clutches are arranged such that, upon the engagement of the at least two of the intermediate clutches during the clutch braking function, the second intermediate shaft and the output shaft are stopped relative to the first intermediate shaft.

8. The control system of claim 1,
wherein the at least two of the intermediate clutches include at least three intermediate clutches, each with a respective transmission ratio, and
wherein the controller is configured to, prior to the engagement of the at least three intermediate clutches during the clutch braking function, select a first intermediate clutch and a second intermediate clutch of the at least three intermediate clutches for the engagement based on the transmission ratios.

9. The control system of claim 8, wherein the controller is configured to select two of the at least one intermediate clutch for engagement that have a greatest difference in the transmission ratios.

10. The control system of claim 1, wherein the plurality of intermediate clutches include a plurality of range clutches and a plurality of speed clutches, and wherein the controller is configured to generate, upon the implementation of the clutch braking function, the clutch commands to engage at least two of the range clutches as the at least two of the intermediate clutches selected such that the output shaft is slowed and stopped to stop the work vehicle.

11. The control system of claim 1, wherein the plurality of intermediate clutches include a plurality of range clutches and a plurality of speed clutches, and wherein the controller is configured to generate, upon the implementation of the clutch braking function, the clutch commands to engage at least two of the speed clutches as the at least two of the intermediate clutches selected such that the output shaft is slowed and stopped to stop the work vehicle.

12. A control system for operating a powertrain of a work vehicle having an engine configured to generate power for an output shaft, the control system comprising:
a transmission positioned operatively between the engine and the output shaft and configured to selectively transfer the power along a power flow path between the engine and the output shaft, the transmission including:
an input shaft configured to receive the power from the engine;
at least one intermediate shaft arranged in the power flow path between the input shaft and the output shaft;
at least one directional clutch configured for selective engagement to transfer power between the input shaft and the at least one intermediate shaft; and
a plurality of intermediate clutches configured for selective engagement to transfer power between the at least one intermediate shaft and the output shaft; and
a controller, having a processor and memory architecture, configured to:
receive a vehicle stop request to stop the work vehicle;
implement, upon receiving the vehicle stop request, a clutch braking function;
generate, upon the implementation of the clutch braking function, clutch commands to engage at least two of the intermediate clutches selected such that the output shaft is slowed and stopped to stop the work vehicle;
determine, upon engagement of the at least two of the intermediate clutches during the clutch braking function, when the output shaft is stopped; and
engage, upon determining that the output shaft is stopped during the clutch braking function, a vehicle parking brake to maintain a stationary position of the work vehicle.

13. The control system of claim 12, wherein the controller is further configured to disengage, upon engaging the vehicle parking brake, the engagement of the at least two of the intermediate clutches to terminate the clutch braking function.

14. A control system for operating a powertrain of a work vehicle having an engine configured to generate power for an output shaft, the control system comprising:
a transmission positioned operatively between the engine and the output shaft and configured to selectively transfer the power along a power flow path between the engine and the output shaft, the transmission including:
an input shaft configured to receive the power from the engine;
at least one intermediate shaft arranged in the power flow path between the input shaft and the output shaft;
at least one directional clutch configured for selective engagement to transfer power between the input shaft and the at least one intermediate shaft; and
a plurality of intermediate clutches configured for selective engagement to transfer power between the at least one intermediate shaft and the output shaft; and
a controller, having a processor and memory architecture, configured to:
receive a vehicle stop request to stop the work vehicle;
implement, upon receiving the vehicle stop request, a clutch braking function;
generate, upon the implementation of the clutch braking function, clutch commands to engage at least two of the intermediate clutches selected such that the output shaft is slowed and stopped to stop the work vehicle;
generate, upon receipt of the vehicle stop request, an engine brake command to engage an engine brake; and
generate, upon generation of the engine brake command, the clutch commands to maintain an engagement of the at least one directional clutch.

15. A work vehicle comprising:
an engine;
an output shaft;
a transmission positioned operatively between the engine and the output shaft and configured to selectively transfer power along a power flow path between the engine and the output shaft, the transmission including:
an input shaft configured to receive the power from the engine;
at least one intermediate shaft arranged in the power flow path between the input shaft and the output shaft;
at least one directional clutch configured for selective engagement to transfer between the input shaft and the at least one intermediate shaft; and
a plurality of intermediate clutches configured for selective engagement between the at least one intermediate shaft and the output shaft; and
a controller, having a processor and memory architecture, configured to:
receive a vehicle stop request to stop the work vehicle with a clutch braking function;

implement, upon receiving the vehicle stop request, the clutch braking function;

generate, upon the implementation of the clutch braking function, clutch commands to engage at least two of the intermediate clutches selected such that the output shaft is slowed and stopped to stop the work vehicle; and maintain the engagement of the at least two of the intermediate clutches such that the work vehicle is at least temporarily maintained in a stationary position.

16. The work vehicle of claim 15, wherein the controller is further configured to disengage, upon the implementation of the clutch braking function and prior to engagement of the at least two of the intermediate clutches, the at least one directional clutch to disconnect the power flow path between the input shaft and the at least one intermediate shaft.

17. The work vehicle of claim 15, wherein the controller is further configured to:

determine, upon engagement of the at least two of the intermediate clutches during the clutch braking function, when the output shaft is stopped; and engage, upon determining that the output shaft is stopped during the clutch braking function, a vehicle parking brake to maintain a stationary position of the work vehicle.

18. The work vehicle of claim 17, wherein the controller is further configured to disengage, upon engaging the vehicle parking brake, the engagement of the at least two of the intermediate clutches to terminate the clutch braking function.

* * * * *